United States Patent
Ra et al.

(10) Patent No.: US 10,048,554 B2
(45) Date of Patent: Aug. 14, 2018

(54) LIQUID CRYSTAL DISPLAY AND REPAIRING METHOD THEREOF

(71) Applicant: Samsung Display Co., Ltd., Yongin-si (KR)

(72) Inventors: Yoo Mi Ra, Ansan-si (KR); Jae Won Kim, Asan-si (KR); Kyung-Ho Park, Asan-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 35 days.

(21) Appl. No.: 15/005,480

(22) Filed: Jan. 25, 2016

(65) Prior Publication Data
US 2016/0275890 A1 Sep. 22, 2016

(30) Foreign Application Priority Data
Mar. 17, 2015 (KR) .................. 10-2015-0036790

(51) Int. Cl.
*G09G 3/36* (2006.01)
*G02F 1/1362* (2006.01)
*G02F 1/1343* (2006.01)

(52) U.S. Cl.
CPC .. *G02F 1/136259* (2013.01); *G02F 1/136286* (2013.01); *G09G 3/3614* (2013.01); *G09G 3/3659* (2013.01); *G02F 1/13624* (2013.01); *G02F 2001/134345* (2013.01); *G09G 2300/0426* (2013.01); *G09G 2300/0447* (2013.01); *G09G 2330/10* (2013.01)

(58) Field of Classification Search
CPC combination set(s) only.
See application file for complete search history.

(56) References Cited

U.S. PATENT DOCUMENTS

| 8,525,969 | B2 | 9/2013 | Hsu et al. |
| 9,070,599 | B2 * | 6/2015 | Kim ...................... H01L 21/283 |
| 9,329,417 | B2 * | 5/2016 | Wang ..................... G02F 1/1309 |
| 9,530,809 | B2 * | 12/2016 | Ishizaki ............... H01L 27/1225 |
| 9,659,972 | B2 * | 5/2017 | Kim ...................... H01L 27/124 |
| 2015/0146126 | A1 * | 5/2015 | Shin .................. G02F 1/134309 349/43 |

FOREIGN PATENT DOCUMENTS

| KR | 1020130060550 | 6/2013 |
| KR | 1020130096605 | 8/2013 |

* cited by examiner

*Primary Examiner* — Van N Chow
(74) *Attorney, Agent, or Firm* — Cantor Colburn LLP

(57) ABSTRACT

A liquid crystal display includes pixels including a display area that includes a thin film transistor forming area connected to a corresponding data line among data lines, a corresponding gate line among gate lines, and a reference voltage line, two low gray subpixel areas, and one high gray subpixel area disposed between the two low gray subpixel areas, a data driver supplying data signals corresponding to the pixels to the data lines, a gate driver supplying gate voltages corresponding to the pixels to the gate lines, and a voltage supplier supplying a reference voltage to the two low gray subpixel area of the pixels through the reference voltage line, where the reference voltage line extends in a vertical direction along a boundary formed by the high gray subpixel and a first low gray subpixel adjacent to the thin film transistor forming area among the two low gray subpixels.

5 Claims, 8 Drawing Sheets

LIQUID CRYSTAL DISPLAY AND REPAIRING METHOD THEREOF

This application claims priority to Korean Patent Application No. 10-2015-0036790 filed on Mar. 17, 2015, and all the benefits accruing therefrom under 35 U.S.C. § 119, the content of which in its entirety is incorporated herein by reference.

BACKGROUND (a) Field

The invention relates to a liquid crystal display and a repairing method thereof.

(b) Description of the Related Art

Presently, one of the most widely used flat panel displays is a liquid crystal display ("LCD") which includes two display panels on which field generating electrodes, such as a pixel electrode and a common electrode, are formed, and a liquid crystal layer interposed between the two display panels. The LCD displays an image by applying a voltage to at least one of the field generating electrodes to generate an electric field in a liquid crystal layer, determining directions of liquid crystal molecules through the electric field, and controlling polarization of incident light.

Among LCDs, a vertical alignment ("VA") mode LCD, in which long axes of liquid crystal molecules are arranged to be perpendicular to the display panels when no electric field is applied, has been developed.

In the VA mode LCD, securing a wide viewing angle is desired, so for this purpose, a method of forming cutouts such as minute slits and the like in the field generating electrode is used. Since cutouts and protrusions determine tilt directions of the liquid crystal molecules, they can be appropriately disposed to diversify the tilt directions of the liquid crystal molecules in various directions, thereby realizing a wide viewing angle.

In such an LCD, a defective pixel is primarily repaired by using a dark spot repair method. That is, when a bright spot occurs due to a defective pixel, a dark spot may be formed by removing the corresponding pixel electrode.

According to such a dark spot repair method, a good LCD product within a dark spot specification may be manufactured by easily changing a bright spot to a dark spot.

SUMMARY

When a method that forms a minute slit in a pixel electrode to include a plurality of branch electrodes is applied, repairing a dark spot within the dark spot specification is difficult, and effectiveness of the method decreases.

One or more exemplary embodiments of the invention have been made in an effort to solve the above-mentioned problem and other problems. One or more exemplary embodiments of the invention provide a liquid crystal display ("LCD") and a repairing method thereof that may easily change a defective pixel to a dark spot.

An exemplary embodiment of the invention provides an LCD including a plurality of pixels having a display area that includes a thin film transistor ("TFT") forming area connected to a corresponding data line among a plurality of data lines, a corresponding gate line among a plurality of gate lines, and a reference voltage line, two low gray subpixel areas, and one high gray subpixel area disposed between the two low gray subpixel areas, a data driver supplying data signals corresponding to the plurality of pixels to the plurality of data lines, a gate driver supplying gate voltages corresponding to the plurality of pixels to the plurality of gate lines, and a voltage supplier supplying a reference voltage to the two low gray subpixel area of the plurality of pixels through the reference voltage line, wherein the reference voltage line extends in a vertical direction along a boundary formed by the high gray subpixel and a first low gray subpixel adjacent to the TFT forming area among the two low gray subpixels.

In an exemplary embodiment, the TFT forming area may include a first TFT connected to a high gray pixel electrode included in the high gray subpixel area, a second TFT connected to two low gray pixel electrodes included in the data line and the two low gray subpixel areas, and a third TFT connected to the two low gray pixel electrodes and the reference voltage line.

In an exemplary embodiment, each of the low gray subpixel areas may include two domains, and the two domains may be vertically arranged.

In an exemplary embodiment, the high gray pixel electrode and the first TFT may be connected through a first connector formed along boundaries of the two vertically arranged domains included in the first low gray subpixel area.

In an exemplary embodiment, a thickness of the first connector in-plane may vary according to a position thereof.

In an exemplary embodiment, a thickness of the reference voltage line in-plane may vary according to a position thereof.

In an exemplary embodiment, the thickness of the first connector in-plane and the thickness of the reference voltage line in-plane may increase in an area where the first connector and the reference voltage line cross.

In an exemplary embodiment, a point of at least one of the pixels connected to the gate line in the TFT forming area and a point of at least one of the pixels connected to the data line may be cut, the second and third TFTs of at least one of the pixels may be short-circuited, and the first connector and the reference voltage line may be short-circuited.

Another embodiment of the invention provides a repairing method of an LCD which includes a plurality of pixels having a display area that includes a TFT forming area connected to a corresponding data line among a plurality of data lines, a corresponding gate line among a plurality of gate lines, and a reference voltage line, two low gray subpixel areas, and one high gray subpixel area disposed between the two low gray subpixel areas, and a voltage supplier supplying a reference voltage to the two low gray subpixel area of the plurality of pixels through the reference voltage line, wherein the reference voltage line extends in a vertical direction along a boundary formed by the high gray subpixel and a first low gray subpixel adjacent to the TFT forming area among the two low gray subpixels, including cutting a point connected to the gate line in the TFT forming area, cutting a point connected to the data line in the TFT forming area, and connecting a first connector that connects the TFT forming area and the high gray subpixel area and the reference voltage line that crosses the first connector.

In an exemplary embodiment, the repairing method may further include short-circuiting two low gray pixel electrodes of the two low gray subpixel areas included in the TFT forming area and a third TFT connected to the reference voltage line.

In an exemplary embodiment, the repairing method may further include short-circuiting the data line and a second TFT connected to the two low gray pixel electrodes.

Effects of the LCD and the repairing method thereof according to the embodiment of the invention will be described.

According to at least one of the exemplary embodiments of the invention, even when a plurality of branch electrodes are provided by forming a minute slit in a pixel electrode, a defective pixel may become a dark spot.

BRIEF DESCRIPTION OF THE DRAWINGS

The above and other exemplary embodiments, advantages and features of this invention will become more apparent by describing in further detail exemplary embodiments thereof with reference to the accompanying drawings, in which.

DETAILED DESCRIPTION

Figure 1:
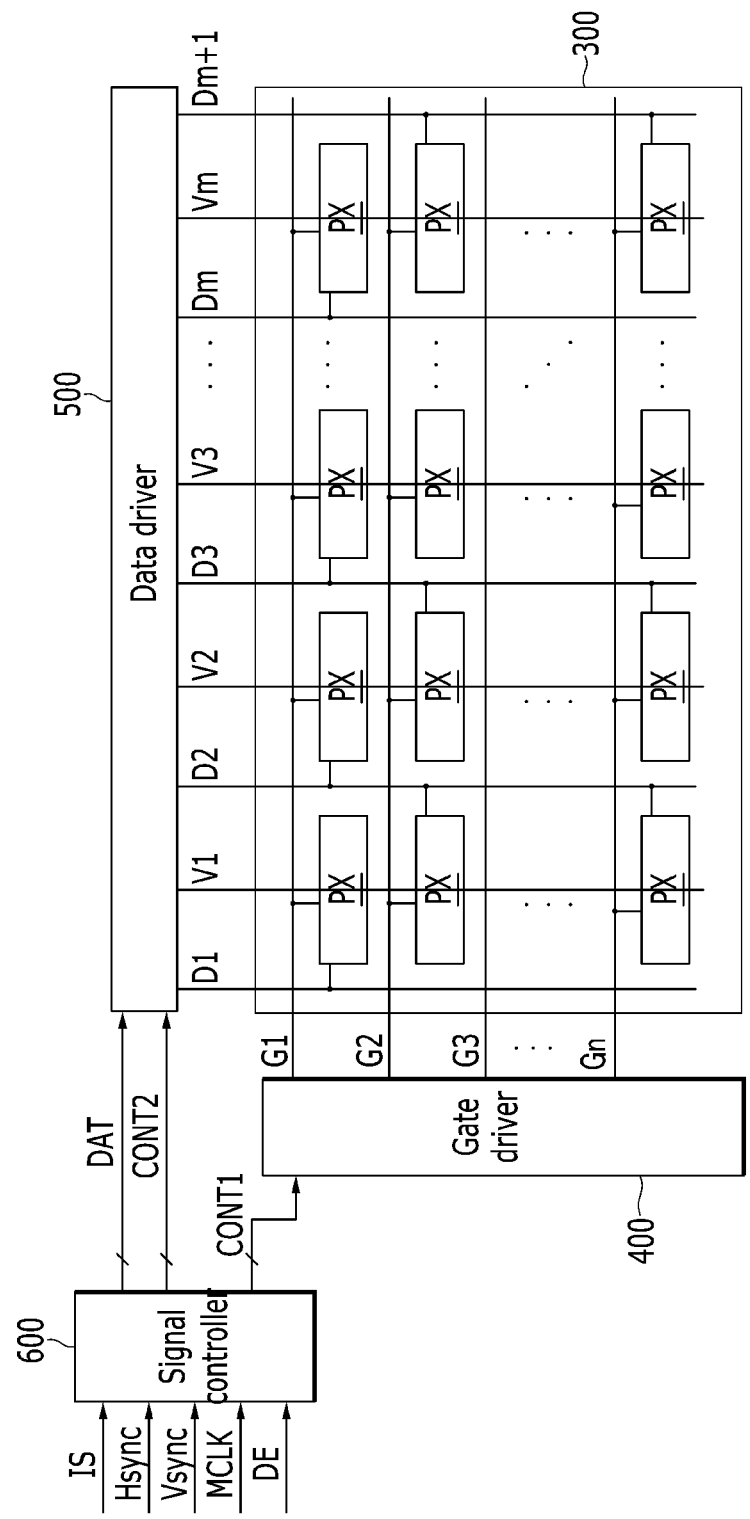
FIG. 1 is a block diagram of an exemplary embodiment of a liquid crystal display ("LCD") according to the invention.

Hereinafter, exemplary embodiments disclosed in the specification will be described in detail with reference to the accompanying drawings. In the specification, the same or similar components will be denoted by the same or similar reference numerals, and duplicate descriptions thereof will be omitted. The terms "module" and "unit" for components used in the following description are used only in order to make the specification more clear. Therefore, these terms do not have meanings or roles that distinguish them from each other by themselves. In describing exemplary embodiments of the specification, when it is determined that a detailed description of the well-known art associated with the invention may obscure the gist of the invention, it will be omitted. The accompanying drawings are provided only in order to allow exemplary embodiments disclosed in the specification to be easily understood and are not to be interpreted as limiting the spirit disclosed in the specification, and it is to be understood that the invention includes all modifications, equivalents, and substitutions without departing from the scope and spirit of the invention.

Terms including ordinal numbers such as first, second, and the like, will be used only to describe various components, and are not interpreted as limiting these components. The terms are only used to differentiate one component from other components.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected to or coupled to another component without the other component intervening therebetween.

Singular forms are to include plural forms unless the context clearly indicates otherwise.

It will be further understood that terms "comprises" or "have" used in the specification specify the presence of stated features, numerals, steps, operations, components, parts, or a combination thereof, but do not preclude the presence or addition of one or more other features, numerals, steps, operations, components, parts, or a combination thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In a repairing method of a display panel according to an exemplary embodiment of the invention, a laser device may be used for cutting a specific electrode or connecting a plurality of electrodes or layers. However, the exemplary embodiment of the invention is not limited thereto, and various known methods that may be used for cutting or connecting in a manufacturing or repairing process of a typical display device may be applied.

FIG. 1 is a block diagram of an exemplary embodiment of a liquid crystal display ("LCD") according to the invention.

As shown in FIG. 1, a display device according to the exemplary embodiment of the invention includes a liquid crystal panel 300, a data driver 500, a gate driver 400, and a data driver 500 that drives the liquid crystal panel 300, and a signal controller 600 that controls the gate driver 400 and the data driver 500.

The display panel 300 includes a plurality of gate lines G1 to Gn and a plurality of data lines D1 to Dm+1. The plurality of gate lines G1 to Gn extend in a horizontal direction, and the plurality of data lines D1 to Dm+1 extend in a vertical direction while being insulated from and crossing with the plurality of gate lines G1 to Gn. Further, reference voltage lines V1 to Vm that extend in the vertical direction are disposed between the plurality of data lines D1 to Dm+1. The reference voltage lines V1 to Vm are insulated from and cross with the gate lines G1 to Gn.

Each gate line and each data line are connected to each corresponding pixel PX. The pixels PX are arranged in a matrix form, and are elongated in a horizontal direction that is an extension direction of the gate lines G1 to Gn. Such horizontal pixels PX may respectively include a thin film transistor ("TFT"), a liquid crystal capacitor, and a storage capacitor.

A control terminal of the TFT may be connected to one of the gate lines G1 to Gn, an input terminal of the TFT may be connected to one of the data lines D1 to Dm+1, and an output terminal of the TFT may be connected to one terminal (pixel electrode) of the liquid crystal capacitor and one terminal of the hold capacitor.

The other terminal of the liquid crystal capacitor may be connected to a common electrode. The other terminal of the storage capacitor is connected to the reference voltage line to receive a reference voltage. In exemplary embodiments, a channel layer of the TFT may include an amorphous silicon, polysilicon, or oxide semiconductor, for example. The reference voltage lines V1 to Vm provide reference voltages to the pixels PX. The reference voltage has a voltage level that does not vary with time. However, in other exemplary embodiments, the reference voltage may have a variable voltage level.

In the LCD according to the exemplary embodiment of the invention, the data lines are alternately connected to pixels PX disposed in the right and left sides of the data line. That is, when one of the data lines is connected to a pixel PX disposed at the right side of a first column, the next one of the data lines is connected to a pixel PX disposed at the left side of a second column, and the further next one of the data lines is again connected to a pixel disposed at the right side of a third column, for example. Each gate line is connected to all the pixels of each row.

In such a structure, an odd pixel and an even pixel that belong to one pixel row are connected to different data lines. Even when the data lines D1 to Dm+1 apply data voltages having the same polarity during one frame, polarity reversal displayed on the pixel PX is represented as dot reversal.

In an exemplary embodiment, the number of the data lines D1 to Dm+1 may be one more than the number (m) of pixel rows. In the exemplary embodiment of FIG. 1, there is no pixel row on the left side of a first data line D1, and therefore, the first data line D1 may be alternately connected only to pixel rows disposed on the right side thereof. Since there is no pixel row on the right side of an (m+1)-th data line Dm+1, the (m+1)-th data line Dm+1 may be alternately connected only to pixel rows disposed on the left thereof.

The signal controller 600 suitably processes operating conditions of the liquid crystal panel 300 in response to input data and a control signal that are inputted from the outside, for example, a vertical synchronization signal Vsync, a horizontal synchronizing signal Hsync, a main clock signal MCLK, a data enable signal DE or the like, and then generates and outputs image data DAT, a gate control signal CONT1, a data control signal CONT2, and a clock signal.

The gate control signal CONT1 may include a scanning start signal that indicates a start of outputting of a gate-on voltage, a gate clock signal that controls the output timing of the gate-on voltage, and the like.

The data control signal CONT2 may include a horizontal synchronization start signal which indicates a start of inputting of image data DAT, a load signal that instructs data voltages to be applied to the data lines D1 to Dm+1.

The plurality of gate lines G1 to Gn of the liquid display panel 300 are connected to the gate driver 400, and the gate driver 400 sequentially receives the gate-on voltage according to the gate control signal CONT1 applied from the signal controller 600.

A gate-off voltage is applied to the gate lines G1 to Gn during a period in which the gate-on voltage is not applied.

The plurality of data lines D1 to Dm+1 of the liquid display panel 300 are connected to the data driver 500, and the data driver 500 receives the data control signal CONT2 and the image data DAT from the signal controller 600.

The data driver 500 converts the image data DAT into a data voltage by using a gray voltage generated by a gray voltage generator (not shown) and transfers the converted data voltage to the data lines D1 to Dm+1. The data voltage includes a positive-polarity data voltage and a negative-polarity data voltage. The positive-polarity data voltage and the negative-polarity data voltage are alternately applied based on frames, columns, or rows to be inversely driven.

Being inversely driven as such is applied when a moving image and/or a still image are/is displayed.

In exemplary embodiments, various pixel connection structures may be provided.

A structure of one pixel PX will now be schematically described with reference to FIG. 2.

Figure 2:
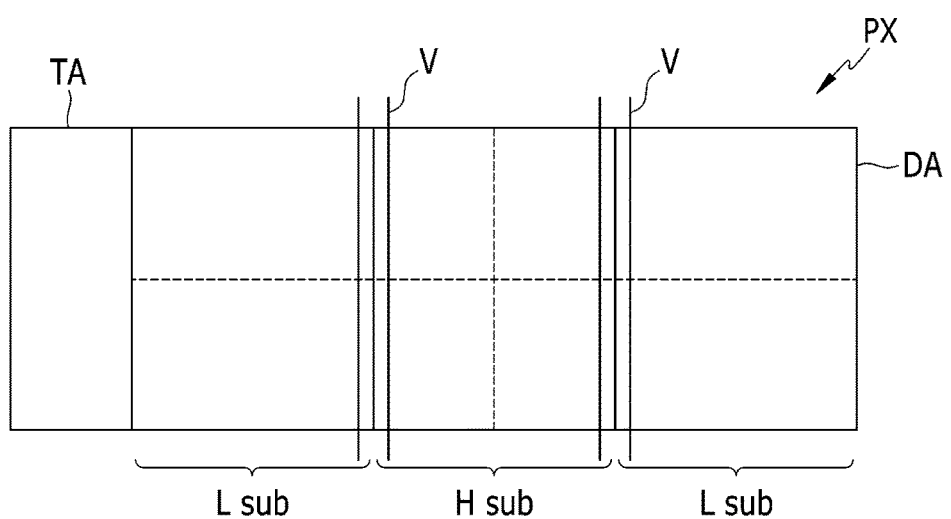
FIG. 2 is a schematic diagram of an exemplary embodiment of a pixel included in an LCD according to the invention.

FIG. 2 is a schematic diagram of a pixel according to an exemplary embodiment of the invention.

The pixel PX according to the exemplary embodiment of the invention is a horizontal pixel that extends in a horizontal direction. The pixel PX includes a TFT forming area TA and a display area DA. A pixel electrode is disposed in the display area DA and an image is displayed through liquid crystal molecules disposed in the display area DA. An element and a wire, which include a TFT that transmits a voltage to be applied to the pixel electrode of the display area DA are formed in the TFT forming area TA.

The display area DA is divided into three subpixel areas which consist of one high gray subpixel area H sub and two low gray subpixel areas L sub. The one high gray subpixel area H sub is disposed at a center of the display area DA, and the two low gray subpixel areas L sub are disposed at opposite sides of the high gray subpixel area H sub. Accordingly, the reference voltage line V vertically passes through the opposite sides of the high gray subpixel area H sub.

In the pixel PX according to the exemplary embodiment of FIG. 2, two reference voltage lines V are disposed in a vertical direction along boundaries between the high gray subpixel area H sub and the two low gray subpixel areas L sub.

In an exemplary embodiment, the high gray subpixel area H sub includes four domains. Each of the low gray subpixel areas L sub includes two domains. The domains are differentiated by dotted lines in FIG. 2. That is, the high gray subpixel area H sub is divided into four domains by lines horizontally and vertically traversing the center thereof, the low gray subpixel area L sub is divided into two domains by a line horizontally traversing the center thereof. Accordingly, the pixel PX includes 8 domains in total.

The reference voltage lines V are disposed at the boundaries between the high gray subpixel area H sub and the two low gray subpixel areas L sub. One of the low gray subpixel areas L sub is disposed at a left side of the left reference voltage line V, and the high gray subpixel area H sub is disposed at a right side thereof. The high gray subpixel area H sub is disposed at a left side of the right reference voltage line V, and the other of the low gray subpixel areas L sub is disposed at a right side thereof.

Figure 3:
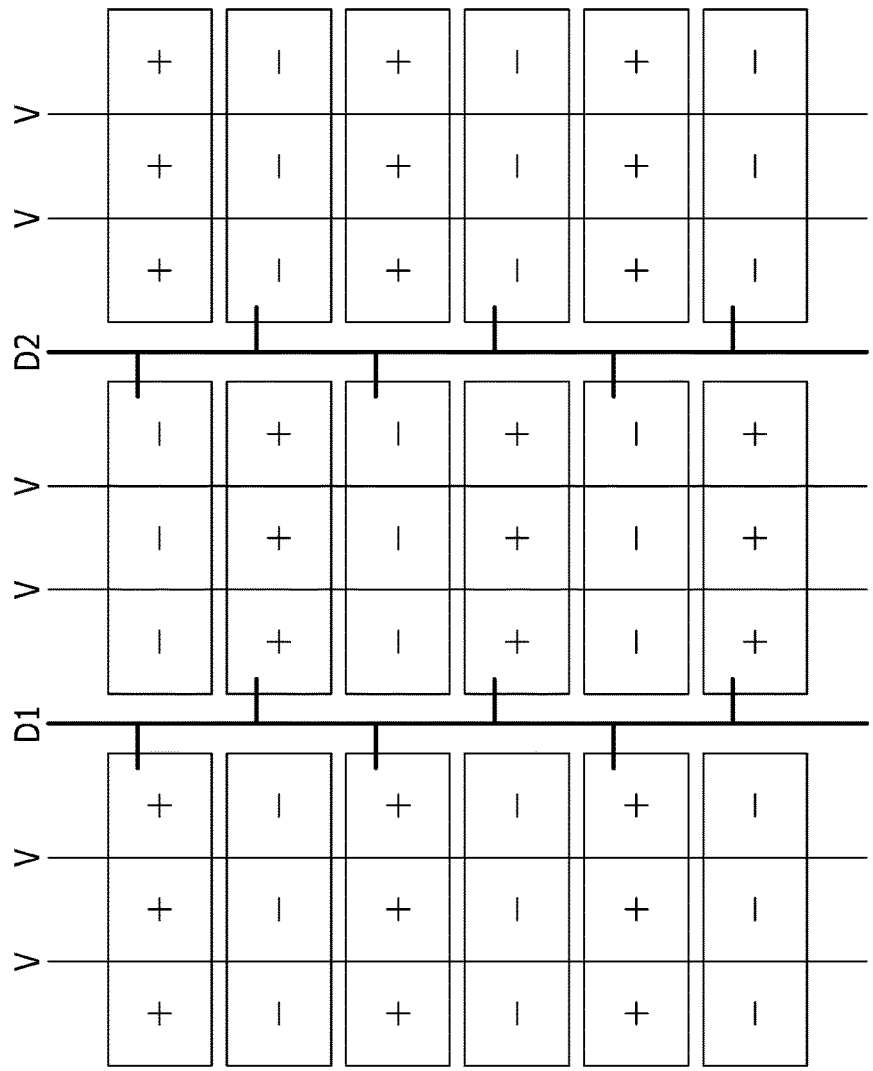
FIG. 3 is a drawing illustrating an exemplary embodiment of a connection relationship between a pixel and a signal line according to the invention.

When one pixel is divided based on two reference voltage lines V, an exemplary embodiment in which a plurality of pixels PX are displayed is illustrated in FIG. 3.

FIG. 3 is a drawing illustrating a connection relationship between a pixel and a signal line according to an exemplary embodiment of the invention.

In FIG. 3, one pixel PX is divided by two reference voltage lines V, and adjacent pixels are arranged to have different polarities from each other. In FIG. 3, D1 and D2 are data lines.

As shown in FIG. 3, each pixel PX is divided into one high gray subpixel area H sub and two low gray subpixel areas L sub, and adjacent pixels receive data voltages with different polarities.

Accordingly, since high gray subpixels are disposed on an upper side and a lower side of the high gray subpixel along a column, and low gray subpixels are disposed on an upper side and a lower side of the low gray subpixel along a column, such that the high gray subpixel and the low gray subpixel are each arranged along a column, a luminance difference does not occur and vertical smudges are not viewed by a user.

Further, since the reference voltage line V is disposed at a boundary between the high gray subpixel area H sub and the low gray subpixel area L sub so as not to cover a pixel, luminance deterioration and reduction of an aperture ratio substantially decrease.

A structure of a pixel electrode and a reference voltage line V of a pixel PX according to an exemplary embodiment of the invention will now be described with reference to FIG. 4.

Figure 4:
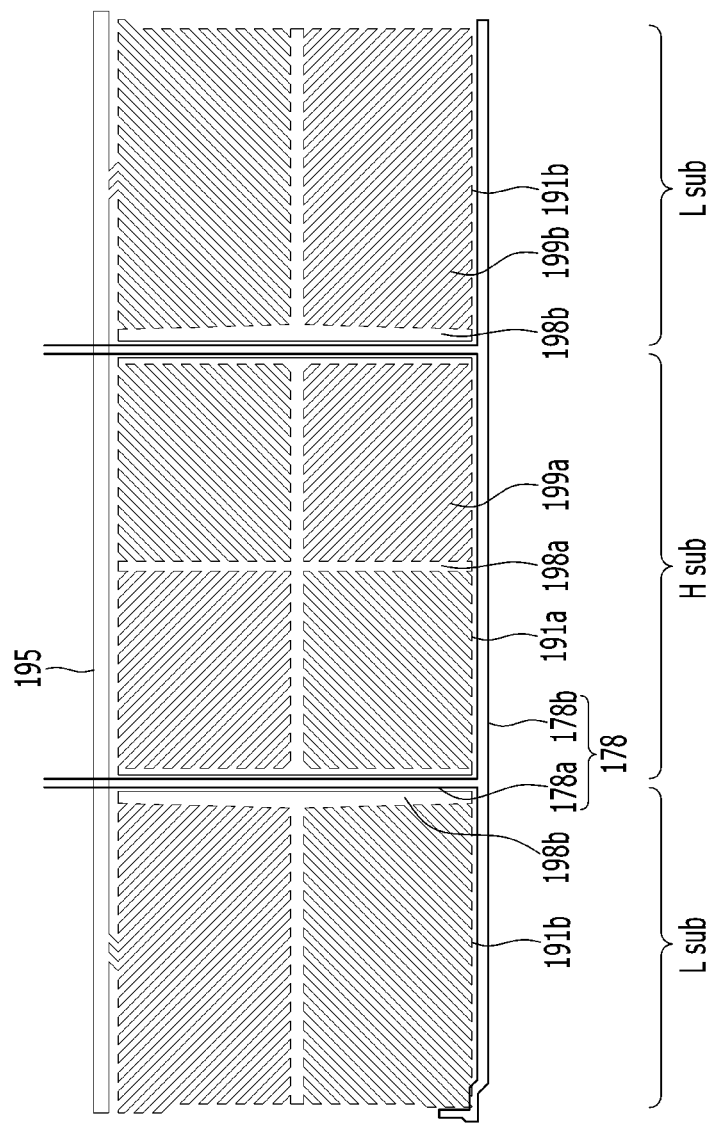
FIG. 4 is a plan view illustrating an exemplary embodiment of a pixel electrode and a periphery of the pixel electrode according to the invention.

FIG. 4 is a plan view illustrating a pixel electrode and a periphery of the pixel electrode according to an exemplary embodiment of the invention.

A pixel electrode disposed in one pixel PX includes an electrode 191a of the high gray subpixel H sub and an electrode 191b of the low gray subpixel L sub.

The high gray pixel electrode 191a includes four unit pixel electrodes corresponding to the four domains, and each of the low gray pixel electrodes 191b includes two unit pixel electrodes corresponding to the two domains.

The unit pixel electrode of the high gray pixel electrode 191a includes a center electrode 198a and a plurality of minute branches 199a outwardly extended from a side of the center electrode 198a. The unit pixel electrode of the low gray pixel electrode 191b includes a center electrode 198b and a plurality of minute branches 199b outwardly extended from a side of the center electrode 198b.

In an exemplary embodiment, the minute branches 199a and 199b may have an angle of about 45 degrees with respect to a horizontal direction or a vertical direction, or may be formed to have an angle of about 40 degrees to about 50 degrees. Each one side of the center electrodes 198a and 198b may be perpendicular to the minute branches 199a and 199b.

The low gray pixel electrodes 191b spaced apart from each other are connected through an electrode connector 195. The electrode connector 195 is extended along an upper portion of the pixel to connect the minute branches 199b of the low gray pixel electrodes 191b to each other.

In a structure where the low gray pixel electrode 191b, the high gray pixel electrode 191a, and low gray pixel electrode 191b are sequentially arranged, the reference voltage line 178 (i.e., reference voltage line V in FIGS. 2 and 3) traverses boundaries of the high gray pixel electrode 191a and the low gray pixel electrode 191b in a vertical direction.

An overall structure of the pixel PX having the pixel electrodes 191a and 191b and the reference voltage line 178 will be described with reference to FIG. 5.

Figure 5:
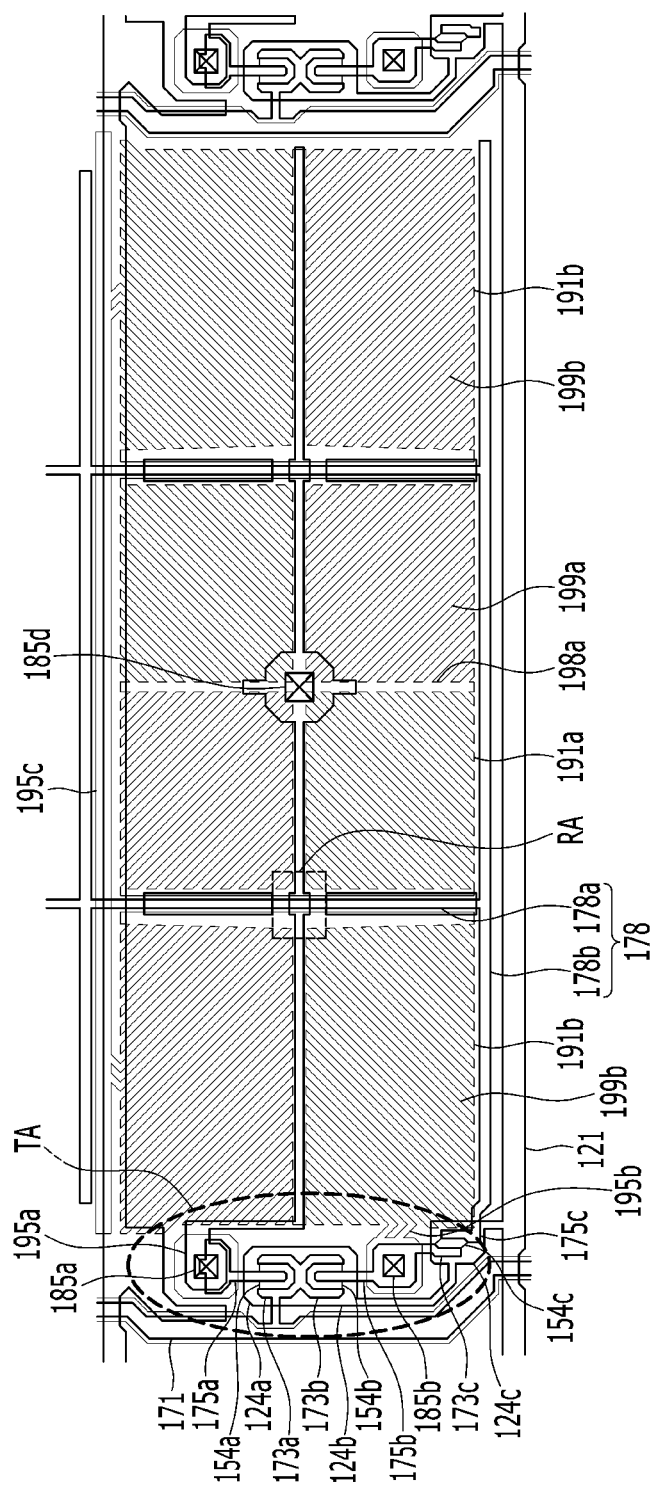
FIG. 5 is a drawing illustrating a detailed structure of the pixel according to the exemplary embodiment of FIG. 4.

FIG. 5 is a drawing illustrating a detailed structure of the pixel according to the exemplary embodiment of FIG. 4.

A lower panel of a liquid crystal panel 300 will be described first. A plurality of gate lines 121 are formed on an insulation substrate.

The gate line 121 extends in a horizontal direction, and include a first gate electrode 124a, a second gate electrode 124b, and a third gate electrode 124c that protrude upward and extend from the gate line 121.

The third gate electrode 124c extends upward from the gate line 121 and then expands, and the first gate electrode 124a and the second gate electrode 124b extend from the third gate electrode 124c.

The first gate electrode 124a and the second gate electrode 124b may be formed in one expanded region. Further, the gate line 121 may include a bending portion that is periodically bent in a main line substantially extending in a horizontal direction.

A gate insulating layer is disposed on the gate line 121. A first semiconductor 154a, a second semiconductor 154b, and a third semiconductor 154c are respectively disposed on the gate insulating layer disposed on the first gate electrode 124a, the gate insulating layer disposed on the second gate electrode 124b, and the gate insulating layer disposed on the third gate electrode 124c.

A data conductor including a data line 171, a first drain electrode 175a, a second drain electrode 175b, a third source electrode 175c, a third drain electrode 175c, and a reference voltage line 178 is disposed on the first, second, and third semiconductors 154a, 154b, and 154c, and the gate insulating layer.

The data line 171 substantially extends in a vertical direction and includes a first source electrode 173a and a second source electrode 173b extending toward the first and second gate electrodes 124a and 124b.

The reference voltage line 178 may include a main line 178a substantially parallel to the data line 171 and a branch portion 178b extending from the main line 178a and substantially parallel to the gate lines 121. The branch portion 178b extends to a thin film area TA along edges of a display area, and one end of the branch 178b forms the third drain electrode 175c.

The first drain electrode 175a faces the first source electrode 173a, the second drain electrode 175b faces the second source electrode 173b, and the third drain electrode 175c faces the third source electrode 173c. The third source electrode 173c is connected to the second drain electrode 175b.

The first gate electrode 124a, the first source electrode 173a, and the first drain electrode 175a form a first TFT together with the first semiconductor 154a. The second gate electrode 124b, the second source electrode 173b, and the second drain electrode 175b form a second TFT together with the second semiconductor 154b. The third gate electrode 124c, the third source electrode 173c, and the third drain electrode 175c form a third TFT together with the third semiconductor 154c.

That is, the first TFT and the second TFT receive a data voltage through their source electrodes, while the third TFT receives a reference voltage through its source electrode.

As described above with reference to FIG. 4, one pixel electrode includes one high gray pixel electrode 191a and two low gray pixel electrode 191b.

The first drain electrode 175a of the first TFT is connected to a first connector 195a through a first contact hole 185a. The first connector 195a extends across the low gray pixel electrode 191b. The first connector 195a may extend along boundaries of two domains included in the low gray pixel electrode 191b. In an exemplary embodiment, the length of the first connector 195a may be about 6 micrometers (μm) to about 8 μm, for example. Further, the first connector 195a is connected to a center electrode 198a of the high gray pixel electrode 191a through a fourth contact hole 185d.

The second drain electrode 175b of the second TFT is connected to the low gray pixel electrode 191b through a second connector 195b. The second drain electrode 175b is connected to the second connector 195b through the second contact hole 185b. The low gray pixel electrode 191b adjacent to the second TFT is directly connected to the second connector 195b and the plurality of minute branches 199b. The second connector 195b by itself includes the plurality of minute branches 199b of the low gray pixel electrode 191b adjacent to the second TFT.

The low gray pixel electrode 191b farther from the second TFT is connected to the low gray pixel electrode 191b adjacent to the second TFT along an upper portion of a pixel (i.e., a display area) through a third connector 195c. The third connector 195c connects the minute branches 199b of the low gray pixel electrodes 191b to each other. The third connector 195c by itself includes the plurality of the minute branches 199b of the low gray pixel electrodes 191b.

An upper panel of the LCD will be now described. A common electrode facing the pixel electrode and receiving a common voltage is disposed on an insulation substrate.

A liquid crystal layer interposed between the lower panel and the upper panel includes liquid crystal molecules having negative dielectric anisotropy. The liquid crystal molecules may be aligned so that long axes thereof are substantially perpendicular to surfaces of the two panels in a state where there is no electric field.

When the data voltage is transmitted to the pixel PX, the data voltage is applied to the high gray pixel electrode 191a through the first TFT as it is. A middle voltage between the data voltage applied through the second TFT and the reference voltage transmitted through the third TFT is applied to the two low gray pixel electrodes 191b. Accordingly, different voltages are applied to the high gray pixel electrode 191a and the two low gray pixel electrodes 191b.

The high and low gray pixel electrodes 191a and 191b applied with different voltages generate an electric field along with a common electrode of the upper panel such that orientation of the liquid crystal molecules of the liquid crystal layer between the two electrodes is determined. In this case, the inclination direction of the liquid crystal molecules may first be determined by a horizontal component that a gap where the pixel electrode is not positioned and a side of an opening of the common electrode distort and generate the main electric field substantially perpendicular to the surface of the display panel. The horizontal component of the main electric field is substantially perpendicular to the sides of the unit pixel electrode and the opening, and the liquid crystal molecules are inclined in a direction substantially perpendicular to the sides thereof.

In the structure shown in FIGS. 4 and 5, when a defect occurs in the high gray pixel H sub, the minute electrode 199a of the high gray pixel electrode disposed at peripheries of the fourth contact hole 185d is cut with a laser for performing a dark spot. However, in this case, the laser cutting process should be precisely performed, and after the minute electrode 199a is cut, since the minute electrode 199a and the center electrode 198a are being electrically connected, the dark spot is not accomplished.

Figure 6:
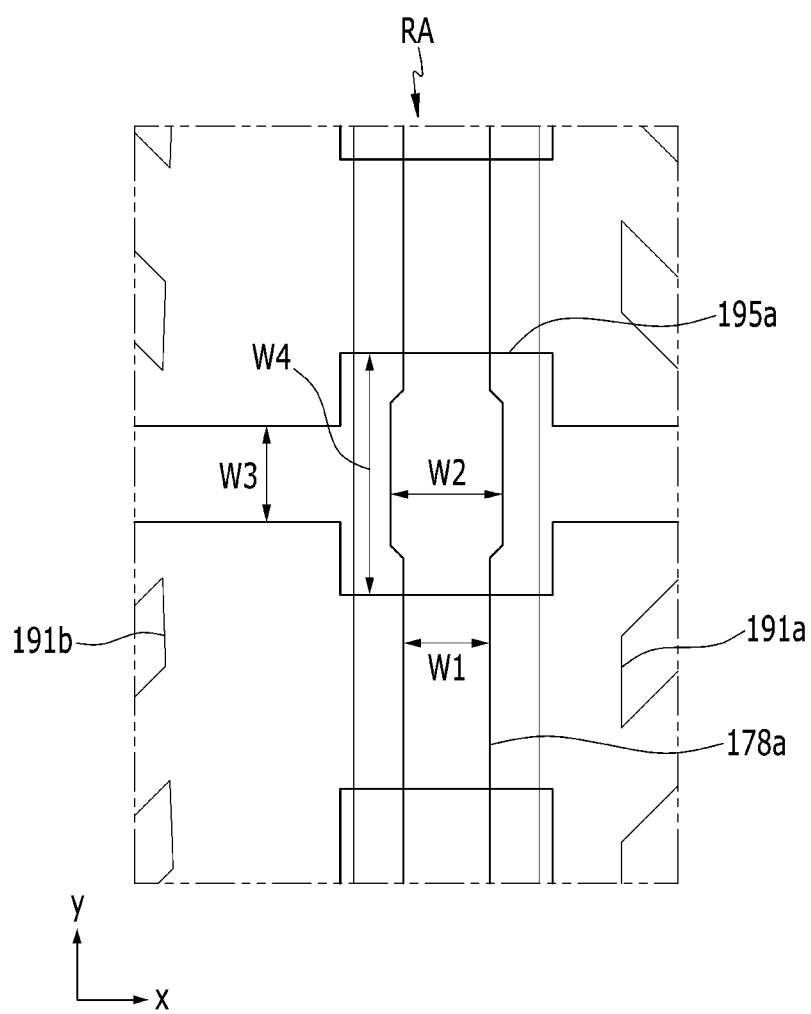
FIG. 6 is a drawing illustrating a detailed structure of electrodes included in the pixel according to the exemplary embodiment of FIG. 5.

FIG. 6 is a drawing illustrating a detailed structure of electrodes included in the pixel according to the exemplary embodiment of FIG. 5, in which an area RA where the reference voltage line 178a and the first connector 195a cross is shown. As shown in FIG. 6, the reference voltage line 178a vertically extends between the high gray pixel electrode 191a and the low gray pixel electrode 191b. The first connector 195a traverses the low gray pixel electrode 191b and extends horizontally.

The vertically extended reference voltage line 178a and the horizontally extended first connector 195a cross between the high gray pixel electrode 191a and the low gray pixel electrode 191b.

A width of the reference voltage line 178a increases in the area RA where the reference voltage line 178a and the first connector 195a cross. More specifically, in an area where the reference voltage line 178a and the first connector 195a do not cross, the width of the reference voltage line 178a may be W1 as shown in FIG. 6. In the area where the reference voltage line 178a and the first connector 195a cross, the width of the reference voltage line 178a may be W2. That is, the width W2 is greater than the width W1. In an exemplary embodiment, the width W2 may be about 4.5 µm, and the width W1 may be about 3.5 µm, for example. In another exemplary embodiment, the width of the reference voltage line 178a may linearly increase from the width W1 to the width W2. In this case, the width of the reference voltage line 178a may be a numerical value calculated in an x-y plane, for example.

In addition, a width of the first connector 195a increases in the area RA where the reference voltage line 178a and the first connector 195a cross. More specifically, in the area where the reference voltage line 178a and the first connector 195a do not cross, the width of the first connector 195a may be the width W3. In the area where the reference voltage line 178a and the first connector 195a cross, the width of the first connector 195a may be the width W4. The width W4 is greater than the width W3. In an exemplary embodiment, the width W4 may be equal to or greater than about 10 µm, and the width W3 may be about 4 µm, for example. Further, the width of the first connector 195a may discretely increase from the widths W1 to W2. In this case, the width of the first connector 195a is a numerical value calculated in an x-y plane.

In addition, the first connector 195a corresponding to the area RA where the reference voltage line 178a and the first connector 195a cross may partially overlap with the high gray pixel electrode 191a and the low gray pixel electrode 191b.

A repairing method of the pixel including the characteristics of the reference voltage line 178a and the first connector 195a described with reference to FIG. 6 will be described with reference to FIGS. 7 and 8.

Figure 7:
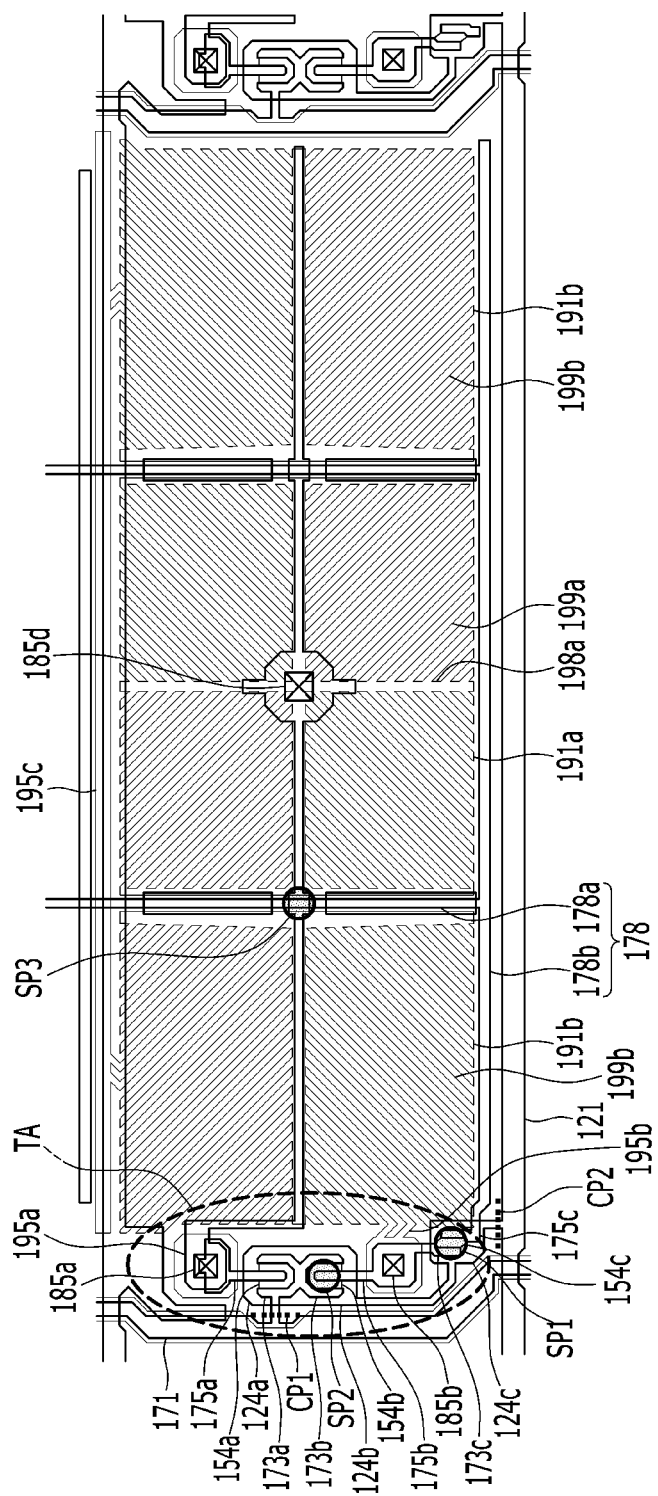
FIG. 7 is a drawing illustrating a method of repairing the pixel according to the exemplary embodiment of FIG. 5.

FIG. 7 is a drawing illustrating a repairing method of the pixel according to the exemplary embodiment of FIG. 5. As shown in FIG. 7, a point CP1 at which the first source electrode 173a, the second source electrode 173b, and the data line 171 are connected is cut.

In addition, a point CP2 that extends from the gate line 121 to the third gate electrode 124c is cut.

Accordingly, a gate-on signal is not applied to the first to third TFTs, and a data voltage is not applied to the source electrodes 173a and 173b of the first and second TFTs.

Next, the first connector 195a connected to the high gray pixel electrode 191a is connected with the reference voltage line 178a. A laser beam and the like is irradiated on a point SP3 where the reference voltage line 178a first connector 195a cross, such that the first connector 195a and the reference voltage line 178a may be short-circuited.

Accordingly, the first connector 195a and the reference voltage line 178a are connected, and the reference voltage is applied to the high gray pixel electrode 191a.

Since the reference voltage is substantially equal to the common voltage, the liquid crystal molecules of the liquid crystal layer that is disposed in the area corresponding to the high gray pixel electrode 191a are arranged in a direction substantially perpendicular to surfaces of an upper substrate and a lower substrate. Accordingly, since light does not transmit through a high gray pixel of the corresponding pixel, the high gray pixel may function as a dark spot.

The third drain electrode 175c, the third gate electrode 124c, and third source electrode 173c extended from the reference voltage line 178b are connected. The reference voltage line 178b, the third gate electrode 124c, and the third source electrode 173c may be connected by irradiating the laser beam and the like on the point SP1 where the third gate electrode 124c, the third drain electrode 175c, and the third source electrode 173c are disposed.

Accordingly, all of the third gate electrode 124c, the first gate electrode 124a, and second gate electrode 124b that are separated from the gate line 121 are connected to the reference voltage line 178b.

Next, all of the second gate electrode 124b, the second source electrode 173b, and second drain electrode 175b are connected. The second TFT may be short-circuited by irradiating the laser and the like on the point SP2 where the second gate electrode 124b, the second source electrode 173b, and the second drain electrode 175b are disposed.

Accordingly, the second source electrode 173b and second drain electrode 175b separated from the data line 121 are connected to the reference voltage line 178b. The reference voltage is applied to the second drain electrode 175b of the second TFT through the low gray pixel electrode 191b and the second connector 195b. Then, the reference voltage is applied to the low gray pixel electrode 191b.

Since the reference voltage is substantially the same as the common voltage, the liquid crystal molecules of the liquid crystal layer that is disposed in the area corresponding to the low gray pixel electrode 191b are arranged in the direction substantially perpendicular to the surfaces of the upper substrate and the lower substrate. Then, since light does not transmit through a low gray pixel of the corresponding pixel, the low gray pixel may function as a dark spot.

A pixel repaired by the method illustrated in FIG. 7 will now be described with reference to a simplified circuit diagram.

Figure 8:
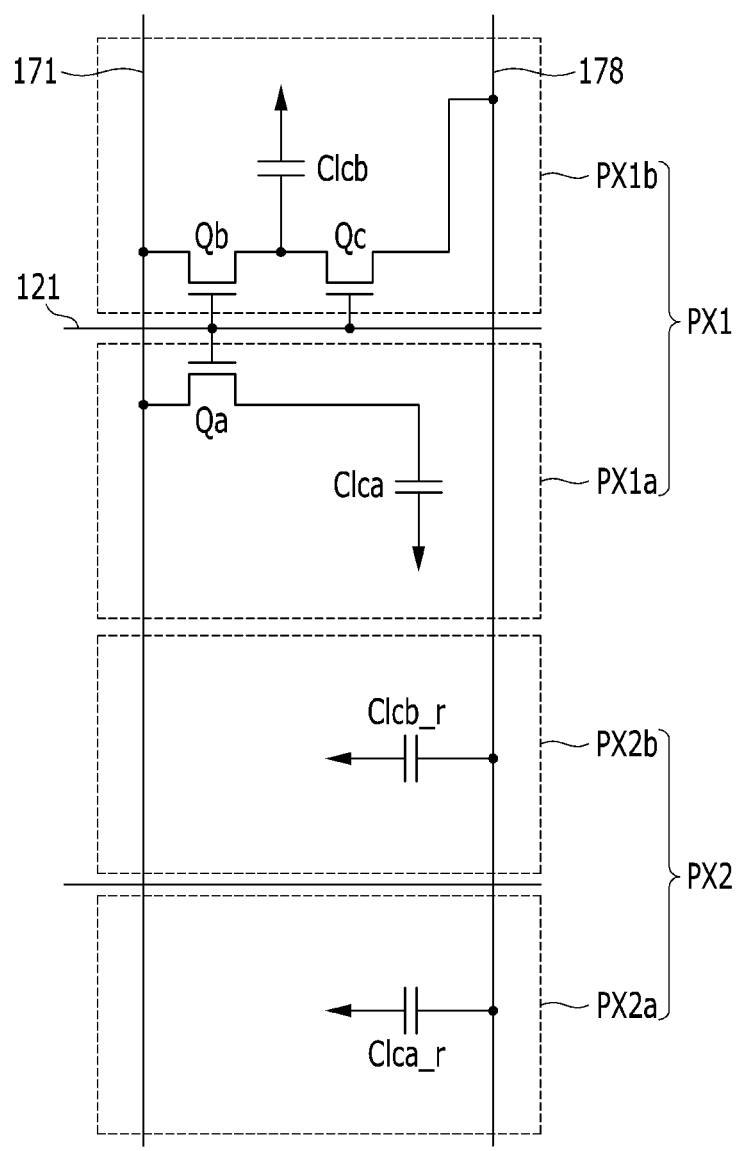
FIG. 8 is an equivalent circuit diagram of an exemplary embodiment of pixels according to the invention.

FIG. 8 is an equivalent circuit diagram of pixels according to an exemplary embodiment of the invention.

Referring to FIG. 8, the LCD according to the exemplary embodiment of the invention includes signal lines such as a gate line 121, a data line 171, a reference voltage line 178 transmitting a reference voltage, and the like, and pixels PX1 and PX2.

The normal pixel PX1 is shown at an upper side of FIG. 8, and the repaired pixel PX2 is shown at a lower side thereof. The normal pixel PX1 includes a high gray subpixel PX1a and a low gray subpixel PX1b. The repaired pixel PX2 includes a high gray subpixel PX2a and a low gray subpixel PX2b.

First, the normal pixel PX1 will be described. The first subpixel PX1a includes a first switching element Qa and a first liquid crystal capacitor Clca, and the second subpixel PX1b includes second and third switching elements Qb, and Qc and a second liquid crystal capacitor Clcb.

The first switching element Qa and the second switching element Qb are respectively connected to the gate line 121 and the data line 171, and the third switching element Qc is connected to an output terminal of the second switching element Qb and the reference voltage line 178.

The output terminal of the first switching element Qa is connected to the first liquid crystal capacitor Clca, and the output terminal of the second switching element Qb is connected to the second liquid crystal capacitor Clcb and an input terminal of the third switching element Qc. A control terminal of the third switching element Qc is connected to the gate line 121, an input terminal thereof is connected to the second liquid crystal capacitor Clcb, and an output terminal thereof is connected to the reference voltage line 178.

Operation of the normal pixel PX1 will be described. First, when a gate-on voltage is applied to the gate line 121, the first switching element Qa, the second switching element Qb, and third switching element Qc that are connected to the gate line 121 are turned on. Accordingly, the data voltage applied to the data line 171 is applied to the first liquid crystal capacitor Clca and the second liquid crystal capacitor Clcb through the turned-on first and second switching elements Qb and Qa such that the first liquid crystal capacitor Clca and the second liquid crystal capacitor Clcb are charged by a difference between the data voltage and the common voltage.

In this case, the same data voltage is transmitted to the first liquid crystal capacitor Clca and the second liquid crystal capacitor Clcb through the first and second switching elements Qa and Qb, but the charging voltage of the second liquid crystal capacitor Clcb is divided through the third switching element Qc.

As a result, the charging voltage of the second liquid crystal capacitor Clcb is less than that of the first liquid crystal capacitor Clca, and thus the luminance of the two subpixels PXa and Pxb may be different. Accordingly, by appropriately adjusting the voltage of the first liquid crystal capacitor Clca and the voltage of the second liquid crystal capacitor Clcb, an image viewed from the side can be controlled to approach an image viewed from the front as closely as possible, thereby improving side visibility.

Next, the repaired pixel PX2 will be described. The first subpixel PX2a includes the first liquid crystal capacitor Clca_r, and the second subpixel PX1b includes the second liquid crystal capacitor Clcb_r.

One end of each of the first and second liquid crystal capacitors Clcb_r and Clca_r is connected to the reference voltage line 178. In addition, the other end of each of the first and second liquid crystal capacitors Clcb_r and Clca_r is connected to the common electrode.

Since the reference voltage is substantially equal to the common voltage, liquid crystal molecules of the first liquid crystal capacitor Clca_r and the second liquid crystal capacitor Clcb_r are arranged in the direction substantially perpendicular to the surfaces of the upper substrate and the lower substrate. Accordingly, since light does not transmit through the high gray pixel of the corresponding pixel, the high gray pixel may function as the dark spot.

However, the structure of the pixels PX1 and PX2 of the LCD according to the exemplary embodiment of the invention may be varied without being limited to the exemplary embodiment of FIG. 8.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a gate line extended in a first direction;
   a data line and a reference voltage line extended in a second direction crossing the first direction; and
   pixels including:
   a thin film transistor forming area connected to the data line, the gate line, and the reference voltage line,
   two low gray subpixels, and
   one high gray subpixel area disposed between the two low gray subpixels;
   wherein the reference voltage line extends in a vertical direction along a boundary formed by the high gray subpixel and a first low gray subpixel adjacent to the thin film transistor forming area among the two low gray subpixels,
   wherein the thin film transistor forming area includes:
   a first thin film transistor connected to a high gray pixel electrode included in the high gray subpixel;
   a second thin film transistor connected to two low gray pixel electrodes included in the data line and the two low gray subpixels; and
   a third thin film transistor connected to the two low gray pixel electrodes and the reference voltage line,
   wherein each of the two low gray subpixels includes two domains, and the two domains are vertically arranged,
   wherein the high gray pixel electrode and the first thin film transistor are connected through a first connector formed along boundaries of the vertically arranged two domains included in a first low gray subpixel area of the two low gray subpixels, and
   wherein a thickness of the first connector in-plane varies according to a position thereof.

2. The liquid crystal display of claim 1, wherein
   a thickness of the reference voltage line in-plane varies according to a position thereof.

3. The liquid crystal display of claim 2, wherein
   the thickness of the first connector in-plane and the thickness of the reference voltage line in-plane increase in an area where the first connector and the reference voltage line cross.

4. The liquid crystal display of claim 3, wherein
   a point of the pixels connected to the gate line in the thin film transistor forming area and a point of the pixels connected to the data line are cut, and the first connector and the reference voltage line are short-circuited.

5. The liquid crystal display of claim 4, wherein
   the second and third thin film transistors of the pixels are short-circuited.

* * * * *